(12) United States Patent
Landoll et al.

(10) Patent No.: US 8,292,557 B2
(45) Date of Patent: Oct. 23, 2012

(54) VEHICLE TRANSPORTER

(75) Inventors: Donald R. Landoll, Marysville, KS (US); Loren F. Wassenberg, Blue Rapids, KS (US); Phillip R. Landoll, Marysville, KS (US); Jim R. Ladner, Marysville, KS (US); Kyle D. Swart, Marysville, KS (US)

(73) Assignee: Landoll Corporation, Marysville, KS (US)

( * ) Notice: Subject to any disclaimer, the term of this patent is extended or adjusted under 35 U.S.C. 154(b) by 0 days.

(21) Appl. No.: 13/008,668

(22) Filed: Jan. 18, 2011

(65) Prior Publication Data

US 2012/0183369 A1  Jul. 19, 2012

(51) Int. Cl.
*B60P 3/07* (2006.01)
*B60P 3/073* (2006.01)
*B60P 3/08* (2006.01)

(52) U.S. Cl. .................. 410/3; 410/4; 410/7; 410/26

(58) Field of Classification Search .................. 410/3, 4, 410/6, 7, 14, 16–18, 24, 26, 27, 29.1, 10, 410/11, 19; B60P 3/07, 3/073, 3/08
See application file for complete search history.

(56) References Cited

U.S. PATENT DOCUMENTS

| | | | | |
|---|---|---|---|---|
| 1,280,512 | A * | 10/1918 | Macomber | 410/16 |
| 5,040,814 | A * | 8/1991 | Lohr | 280/401 |
| 6,450,742 | B1 * | 9/2002 | Jenkins et al. | 410/29.1 |
| 6,558,093 | B1 * | 5/2003 | Arnold et al. | 410/30 |
| 6,857,833 | B1 * | 2/2005 | Rains et al. | 410/4 |
| 7,422,225 | B2 * | 9/2008 | Troha et al. | 280/403 |

* cited by examiner

*Primary Examiner* — Glenn Dayoan
*Assistant Examiner* — Sunsurraye Westbrook
(74) *Attorney, Agent, or Firm* — Law Office of Mark Brown, LLC; Mark E. Brown

(57) ABSTRACT

A vehicle transporter includes a frame with a load deck, a slidable undercarriage mounted on the frame and a subframe movably mounted on the frame between raised and lowered positions. Wheel wells are formed in the deck when the subframe is lowered relative to the frame. A pair of outrigger assemblies each includes a hydraulic piston-and-cylinder lift unit for raising and lowering the transporter whereby the undercarriage can be slid between fore and aft positions.

1 Claim, 22 Drawing Sheets

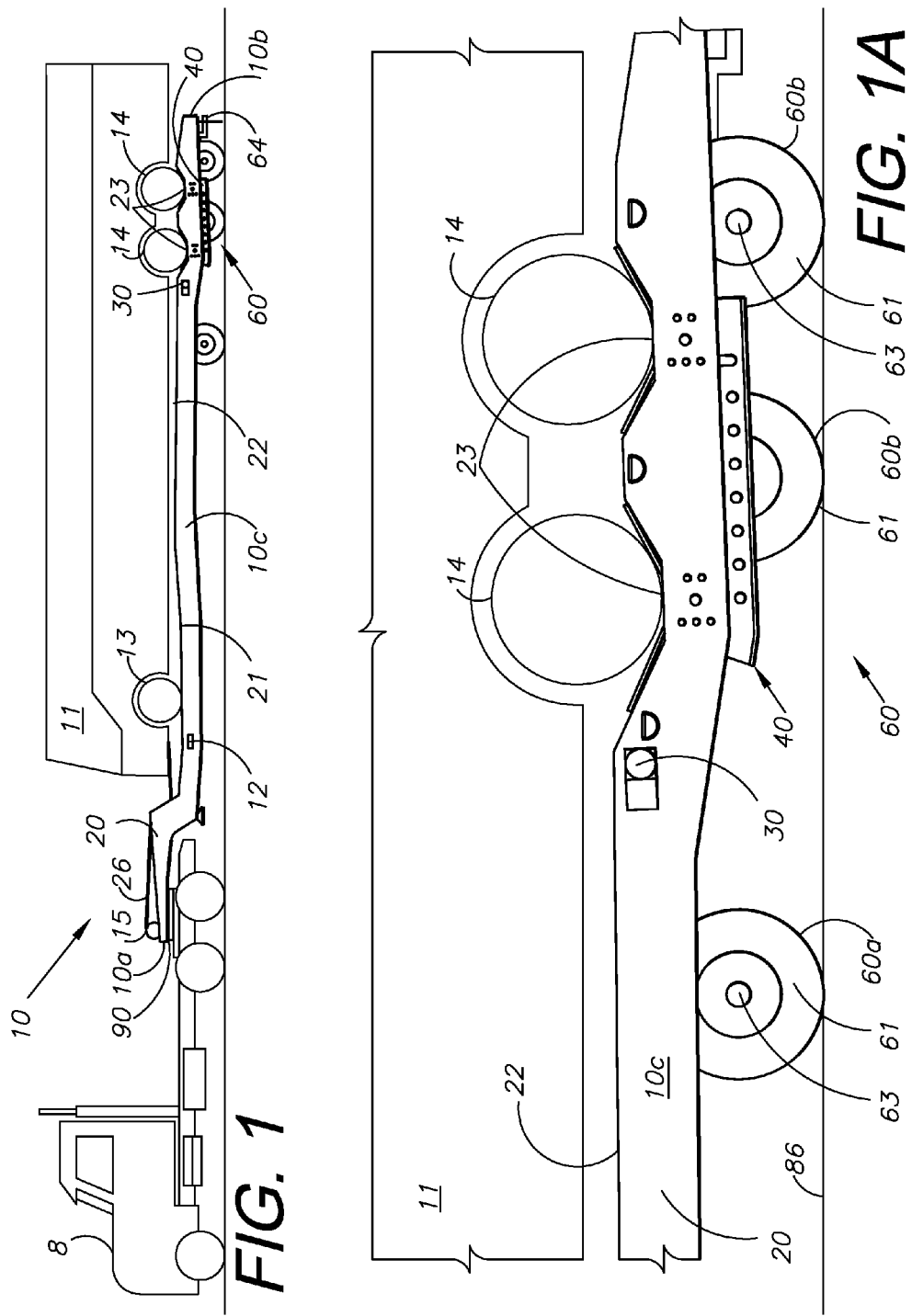

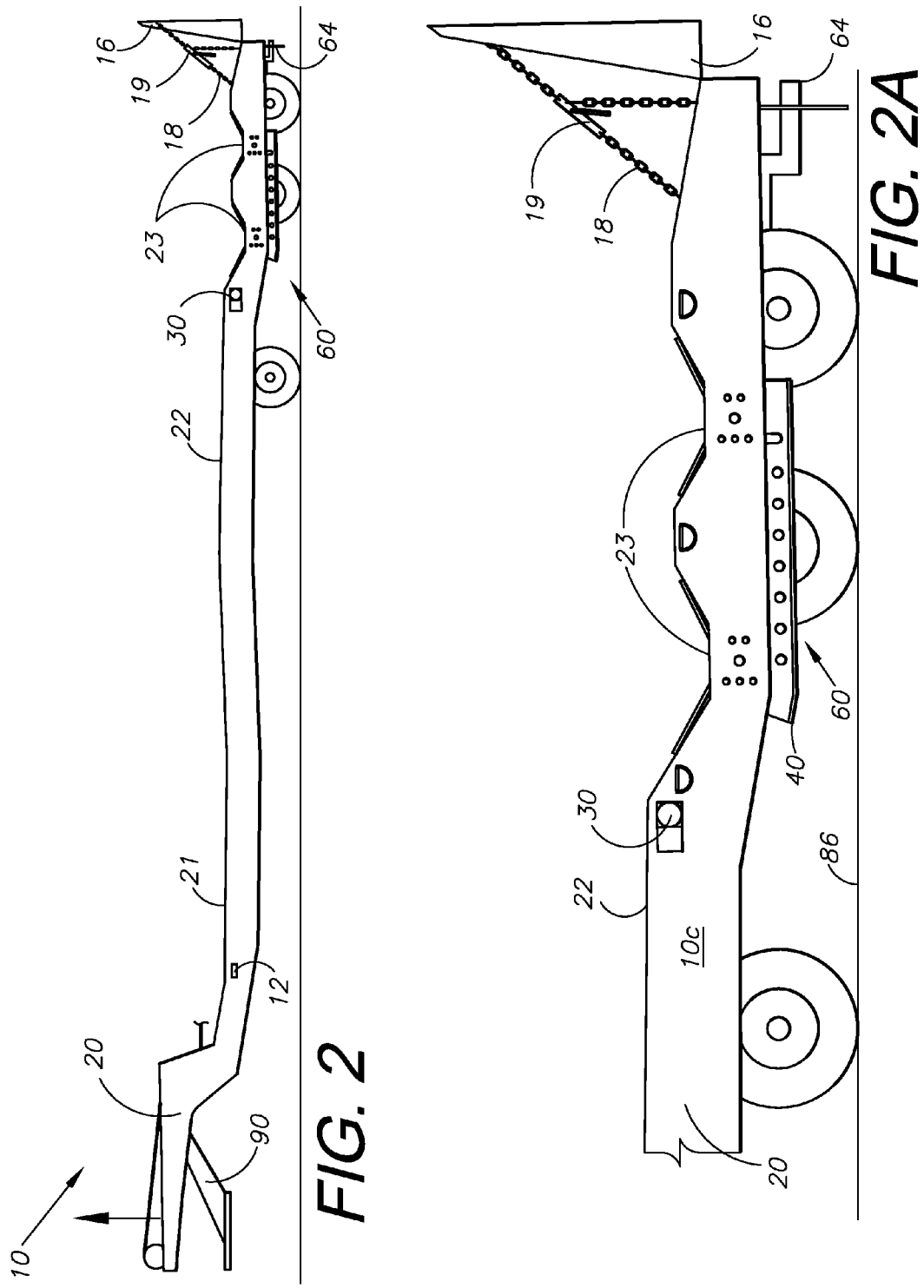

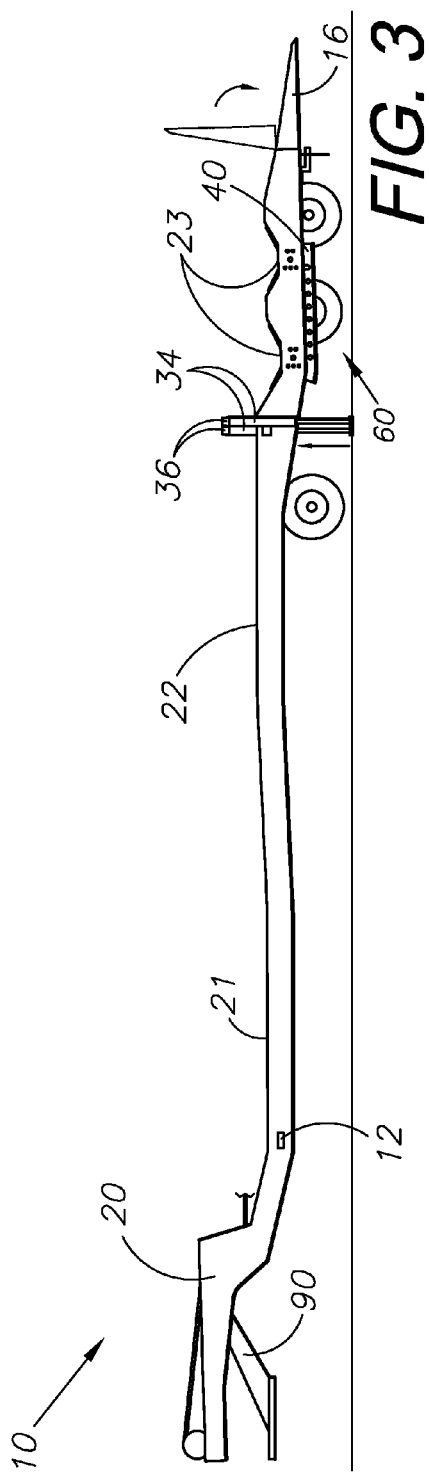
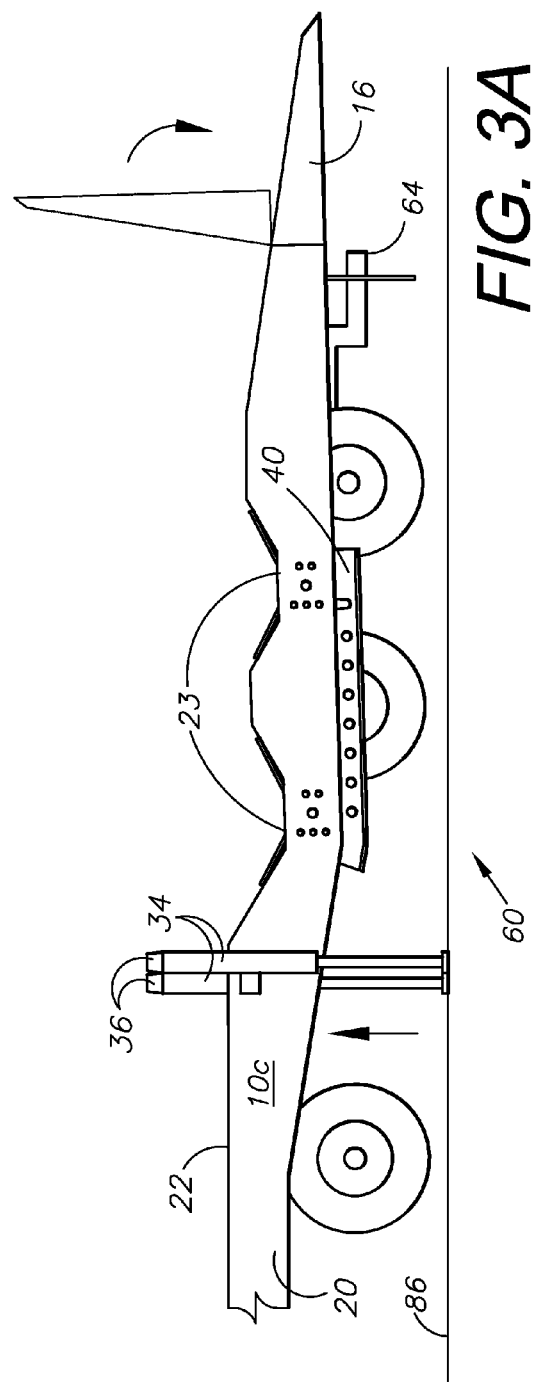

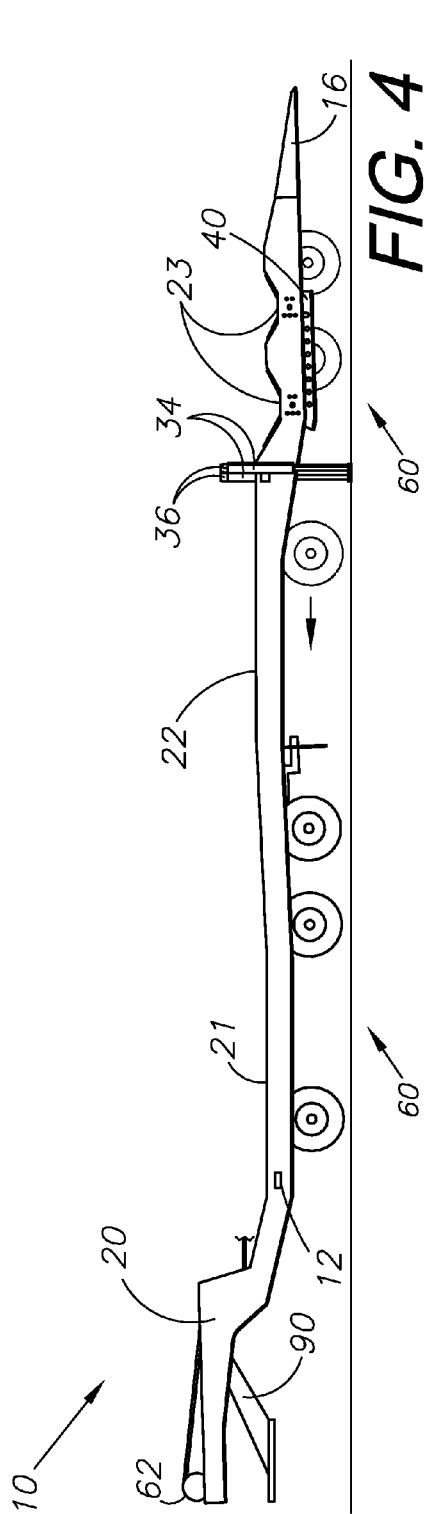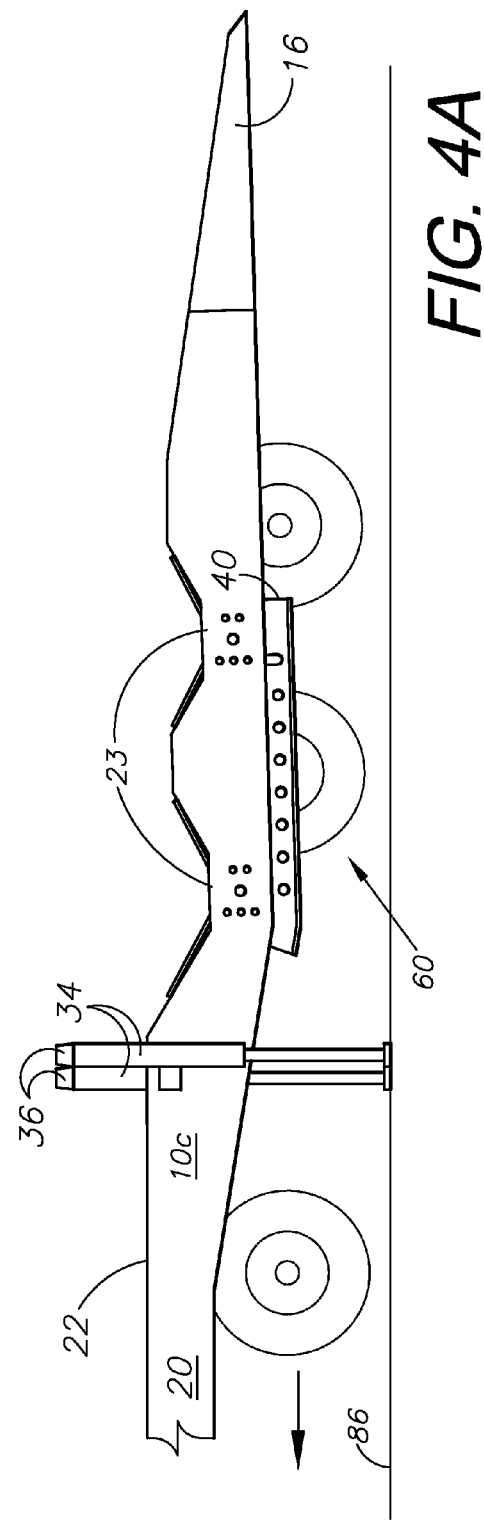

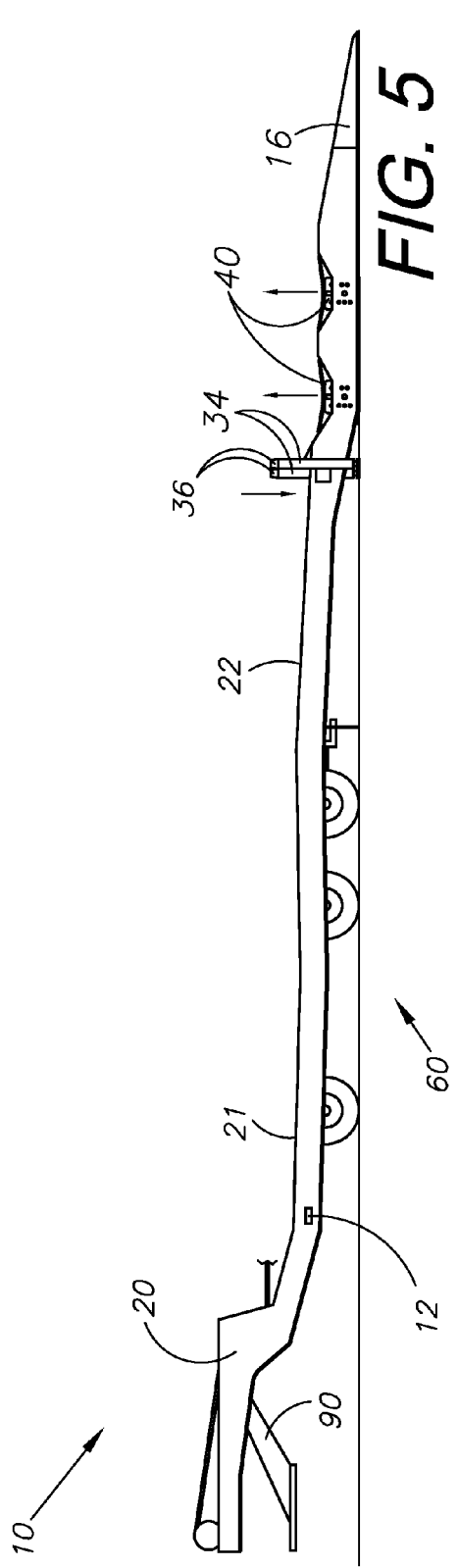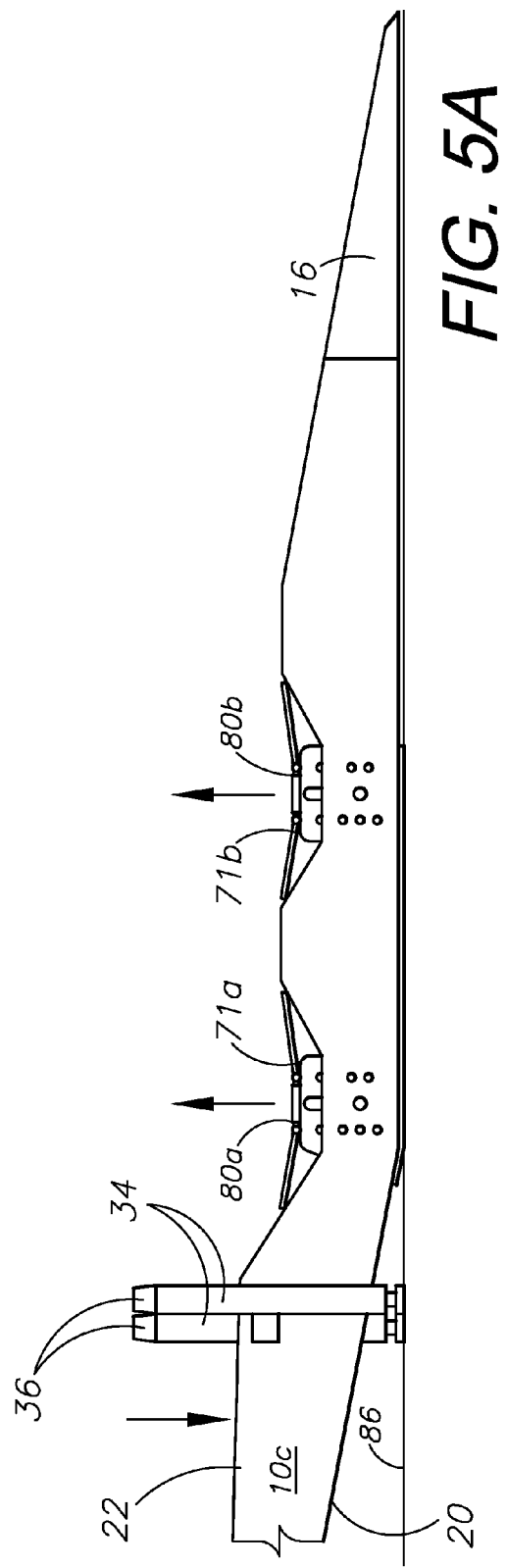

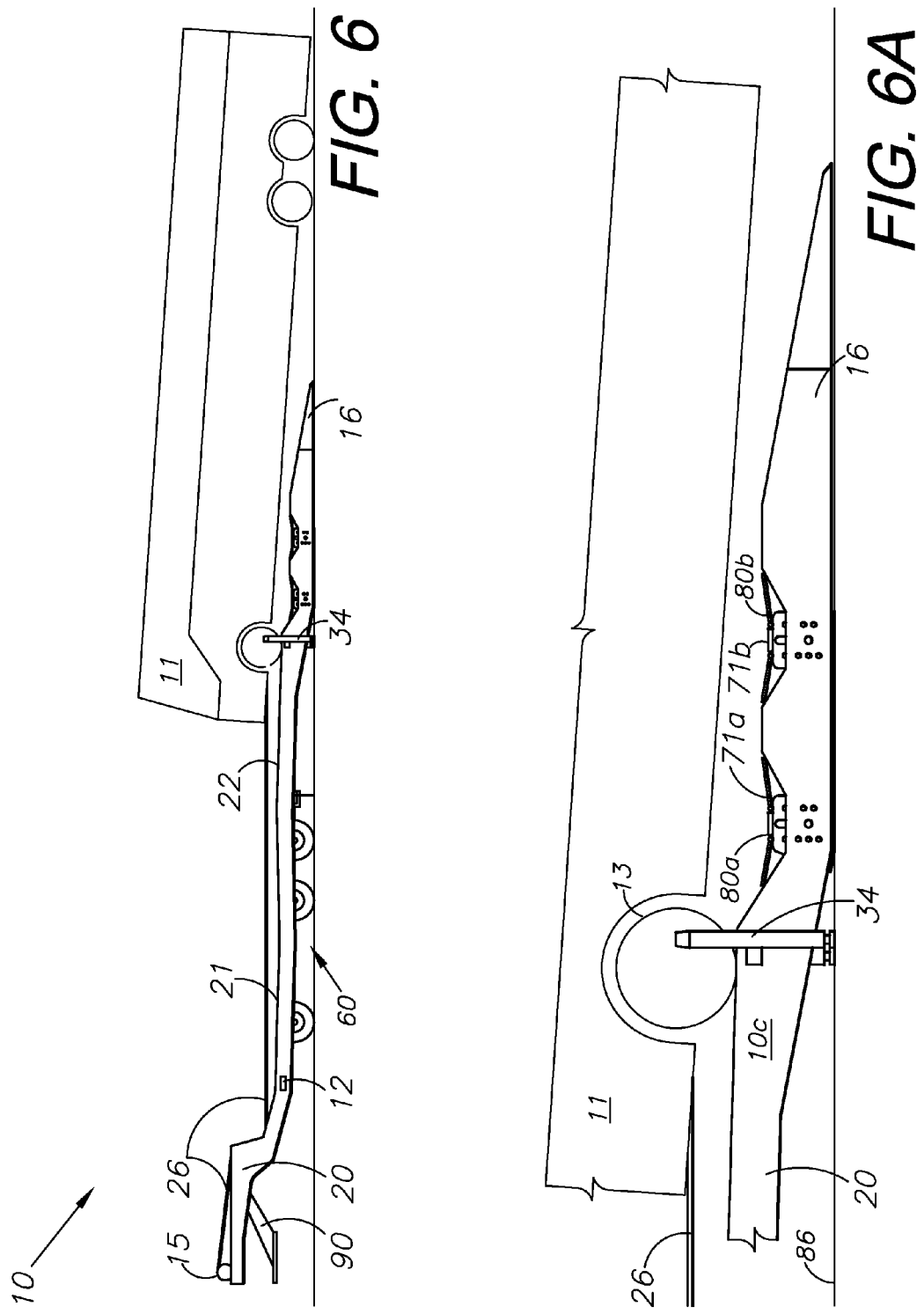

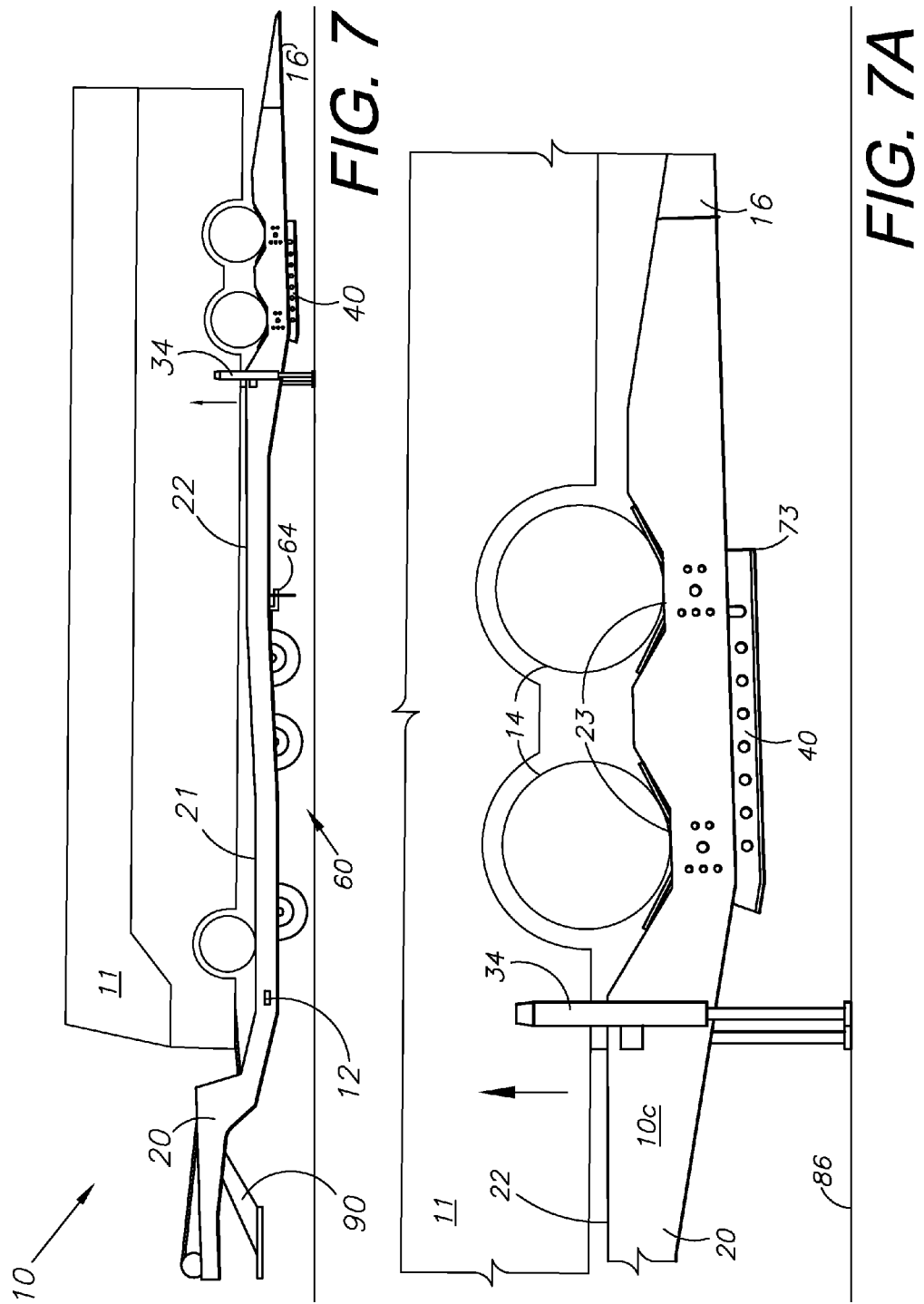

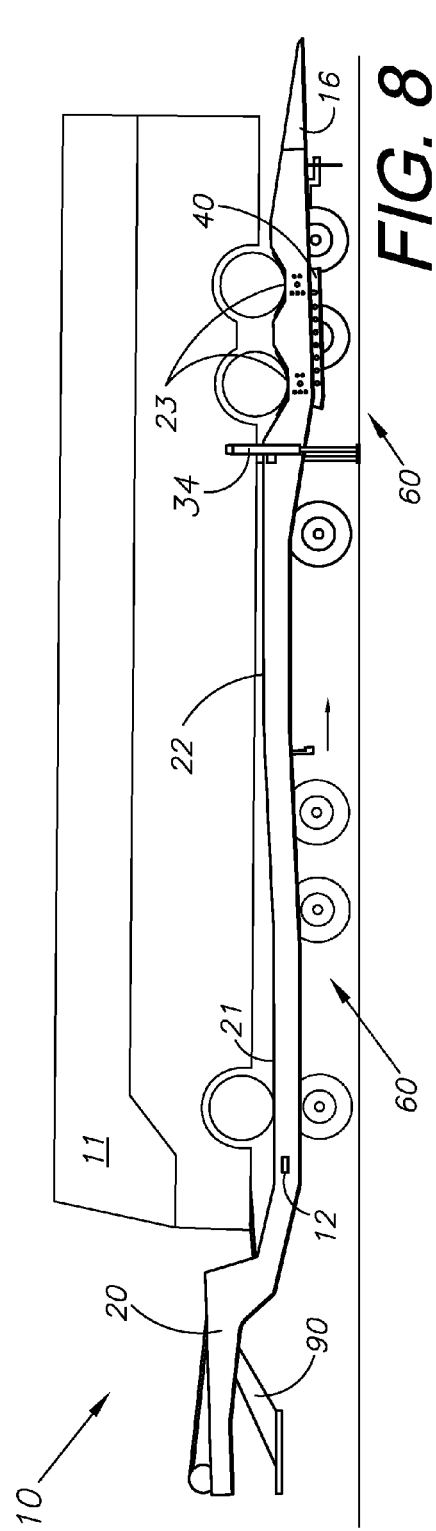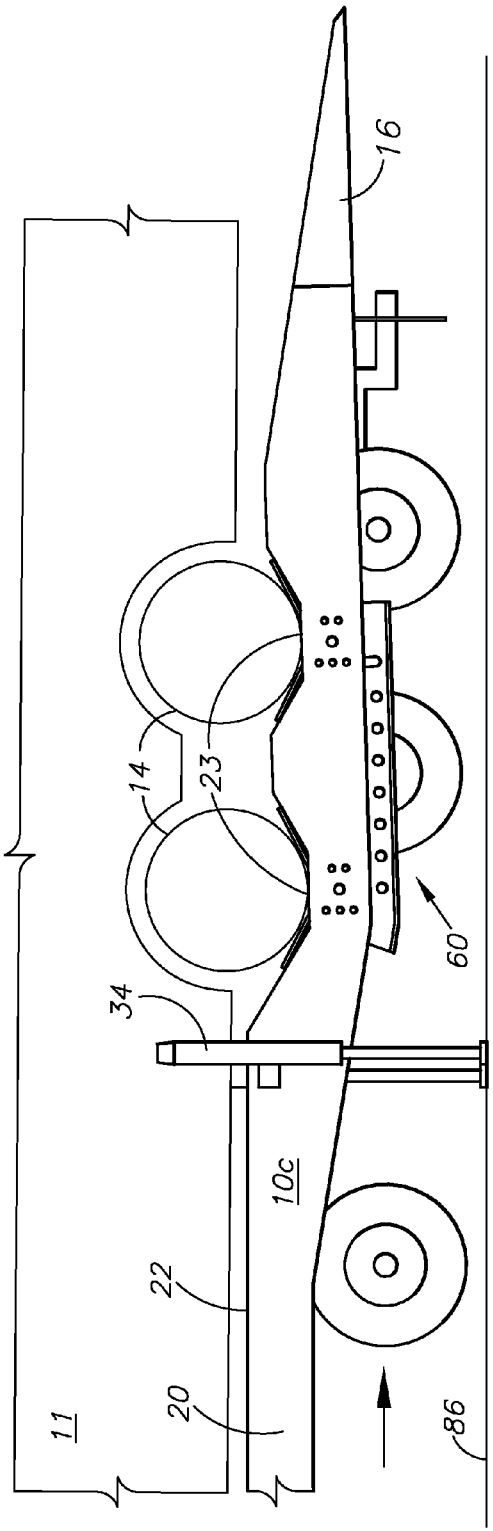

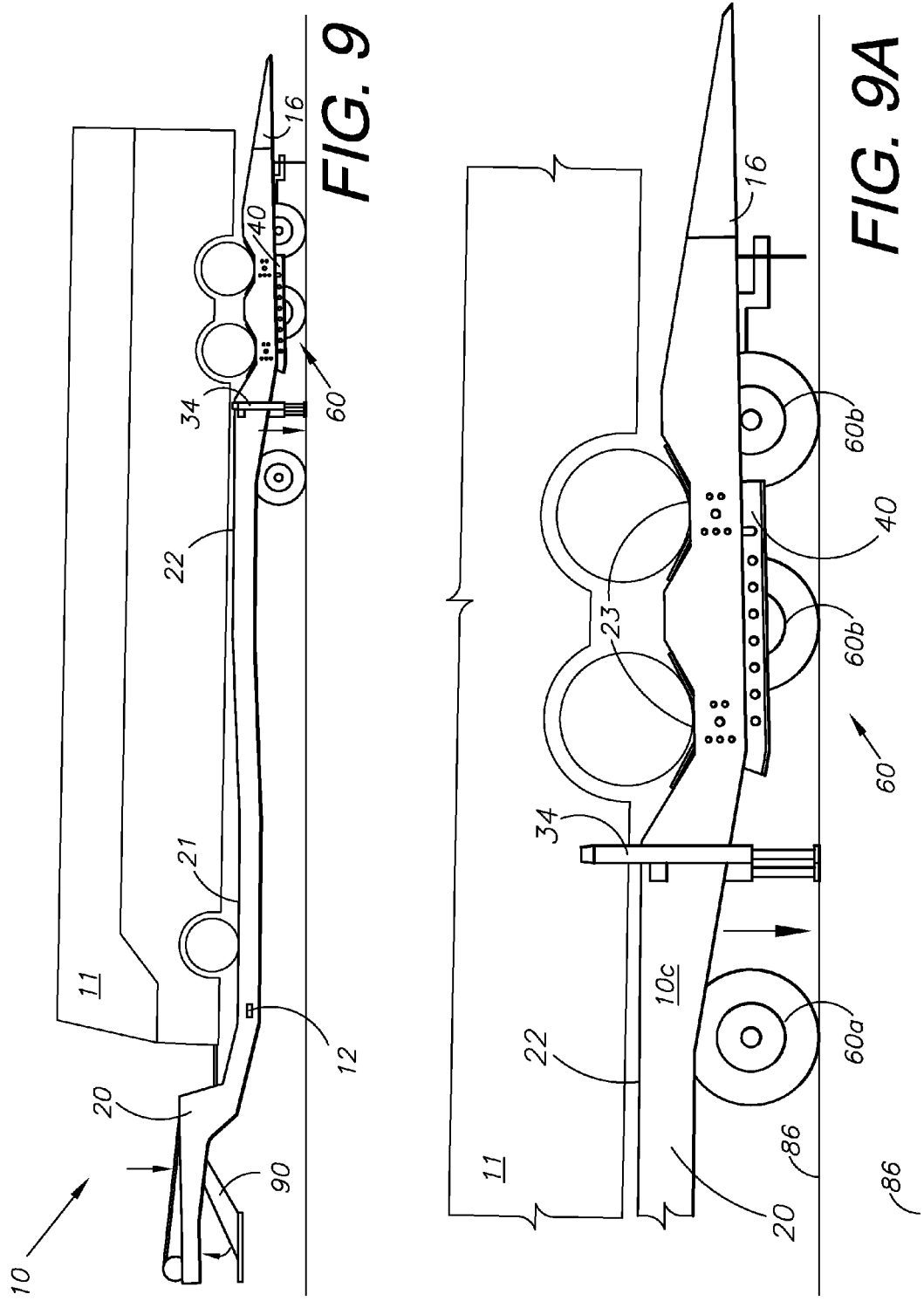

VEHICLE TRANSPORTER

BACKGROUND OF THE INVENTION

1. Field of the Invention

The present invention relates generally to loading and transporting large, low-clearance vehicles, such as buses.

2. Description of the Related Art

Transporting vehicles typically involves transporters which are specially designed for loading, transporting and unloading one or more vehicles. Vehicle transporting operations include delivering vehicles and recovering disabled vehicles for hauling to repair facilities and other locations. Transporters include tow vehicles, which are manufactured in various sizes for accommodating different types of vehicles being recovered and towed.

Transporting vehicles over-the-road presents challenges relating to vehicle loading, stability in transit and related technical considerations. Large vehicles with low ground clearance, such as buses, tend to be particularly difficult to transport with conventional equipment. For example, buses tend to be relatively tall and therefore cannot be significantly elevated due to height restrictions on public highways. Also, their low clearances can interfere with the loading ramps and towing equipment (e.g., hooks, cables and chains) used by conventional transporters. Still further, the heavy weights of buses and other oversize vehicles necessitate the use of specially-designed equipment capable of accommodating such loads.

Heretofore there has not been available a vehicle transporter with the advantages and features of the present invention.

SUMMARY OF THE INVENTION

In the practice of an aspect of the present invention, a vehicle transporter is provided which includes a frame mounting a deck on which a vehicle can be loaded and transported. The frame and the deck tilt to receive a vehicle. An undercarriage including front and rear axles can be repositioned longitudinally for decreasing (i.e., flattening) the angle of tilt of the transporter in a load configuration. A subframe is mounted on the transporter frame and includes raised and lowered positions. In a lowered position the vehicle wheels can be received in load wells formed in the transporter frame and deck by the lowered subframe. In a raised position, the subframe supports the load wheels at approximately the level of the transporter deck whereby the vehicle can be rolled or driven onto or off of the deck. Outriggers are provided on either side of the transporter and include hydraulic jacks for raising the transporter and a load thereon. The front end of the transporter can be raised to incline the frame and deck for loading and unloading. Without limitation, a trailer configuration is shown and described. The transporter could also be configured as a flatbed truck or other vehicle type.

BRIEF DESCRIPTION OF THE DRAWINGS

The drawings constitute a part of this specification and include exemplary embodiments of the present invention illustrating various objects and features thereof.

FIG. 1 and FIG. 1A are side elevation views of a vehicle transporter comprising an aspect of the present invention, shown in a travel configuration with a load vehicle (e.g., a bus) thereon.

FIG. 2 and FIG. 2A are side elevation views of the transporter with its front end raised by a connection assembly.

FIG. 3 and FIG. 3A are side elevation views of the transporter with a pair of outriggers deployed and extended. The outriggers have lifted the back of the transporter and the loading ramps have been lowered into their loading positions.

FIG. 4 and FIG. 4A are side elevation views of the transporter with an undercarriage moved forward to a load position.

FIG. 5 and FIG. 5A are side elevation views of the transporter with the outrigger jacks raised and the transport back end lowered with a subframe and the loading ramps resting on a support surface whereby the transporter is in a load/unload configuration.

FIG. 6 and FIG. 6A are side elevation views of the transporter showing a bus partly on a transporter deck, e.g., in position for a loading or unloading operation.

FIG. 7 and FIG. 7A are side elevation views of the transporter with the outriggers extended and their jacks supporting the transporter back end in a raised position. The subframe is lowered relative to the main frame, allowing the bus wheels to drop into wheel wells.

FIG. 8 and FIG. 8A are side elevation views of the transporter with the undercarriage moved back to its transport position.

FIG. 9 and FIG. 9A are side elevation views of the transporter with the back end of the transporter lowered and the transporter wheels resting on the support surface.

FIG. 19 and FIG. 19A are fragmentary, lower isometric views of the front of the transporter showing a front lift assembly thereof in raised and lowered (relative to the transporter frame) positions respectively, corresponding to respective lowered and raised positions of the transporter front end.

FIG. 19B is an enlarged, isometric view of an undercarriage winch.

DETAILED DESCRIPTION OF THE PREFERRED EMBODIMENTS

I. Introduction and Environment

Figure 10:
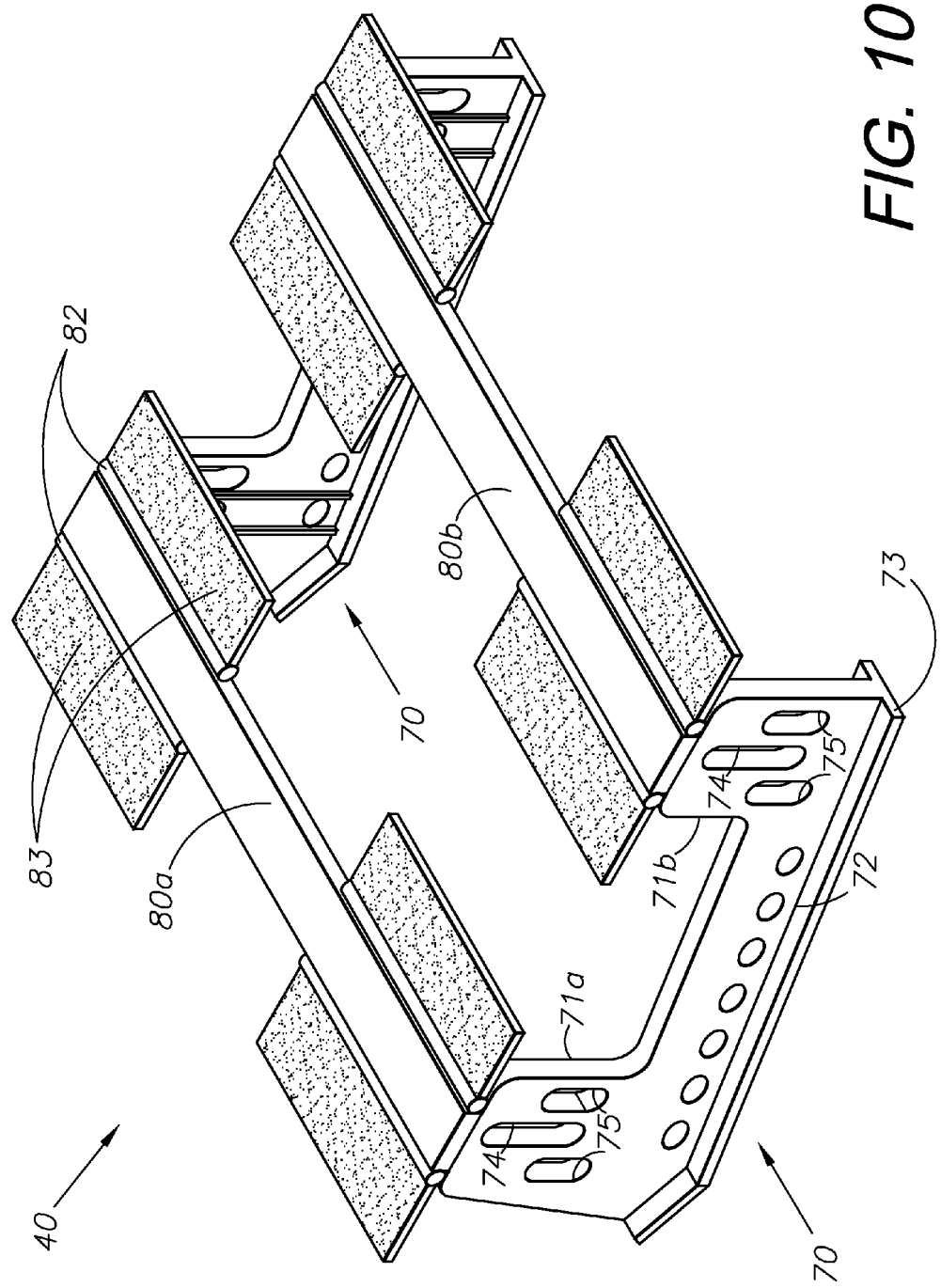
FIG. 10 is an upper, rear isometric view of the subframe.
Figure 11:
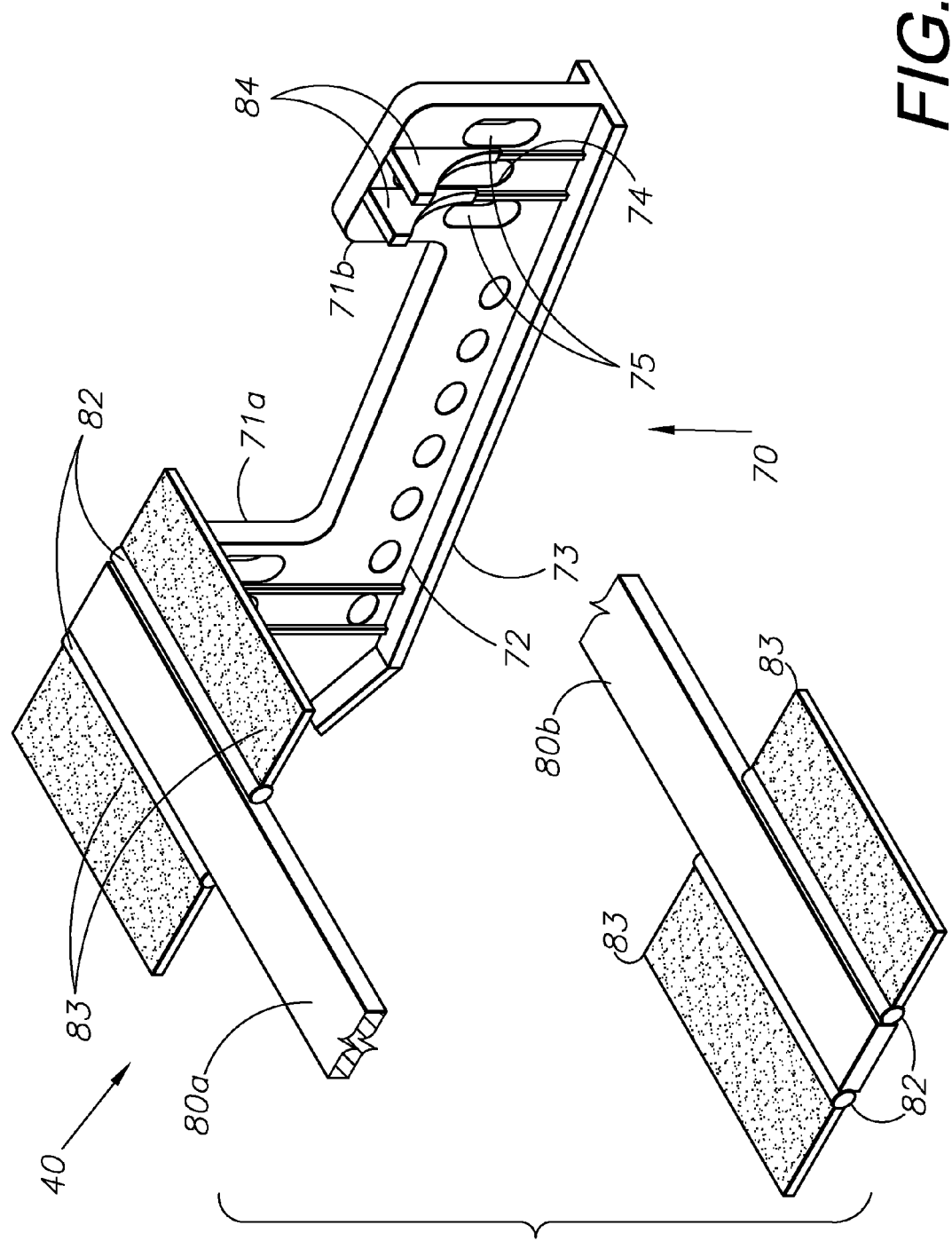
FIG. 11 is a fragmentary isometric view of the subframe with portions broken away to reveal construction.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel. Said terminology will include the words specifically mentioned, derivatives thereof and words of similar meaning.

II. Vehicle Transporter 10

Referring to the drawings in more detail, the reference numeral 10 generally designates a vehicle transporter embodying an aspect of the present invention. Without limitation on the range of the useful applications of the vehicle transporter 10 comprising the present invention, a trailer configuration is shown and is adapted for pulling by a tractor 8 in a conventional tractor-trailer rig configuration. Alternatively, another aspect of the present invention can comprise a self-contained vehicle configured as a flatbed truck with a tilting bed. The vehicle transporter 10 generally comprises a trailer frame 20, an outrigger assembly 30, a load-supporting adjustable subframe 40, a shiftable wheel assembly or undercarriage 60 and a front lifting connection assembly 90. Also without limitation, the transporter 10 is shown transporting a bus 11 including front and rear wheels 13, 14. The transporter 10 is particularly well adapted for transporting large, low-clearance vehicles, such as the bus 11. The transporter 10 is adapted for positioning the bus 11 relatively close to the pavement for maintaining an overall height sufficient to pass under overpasses and other roadway obstacles. For example, federal highway standards currently require a minimum overhead clearance of 16 feet and rural areas and 14 feet in urban areas. The transporter 10 can be adapted for transporting a wide variety of other vehicles with varying sizes and characteristics.

Figure 19:
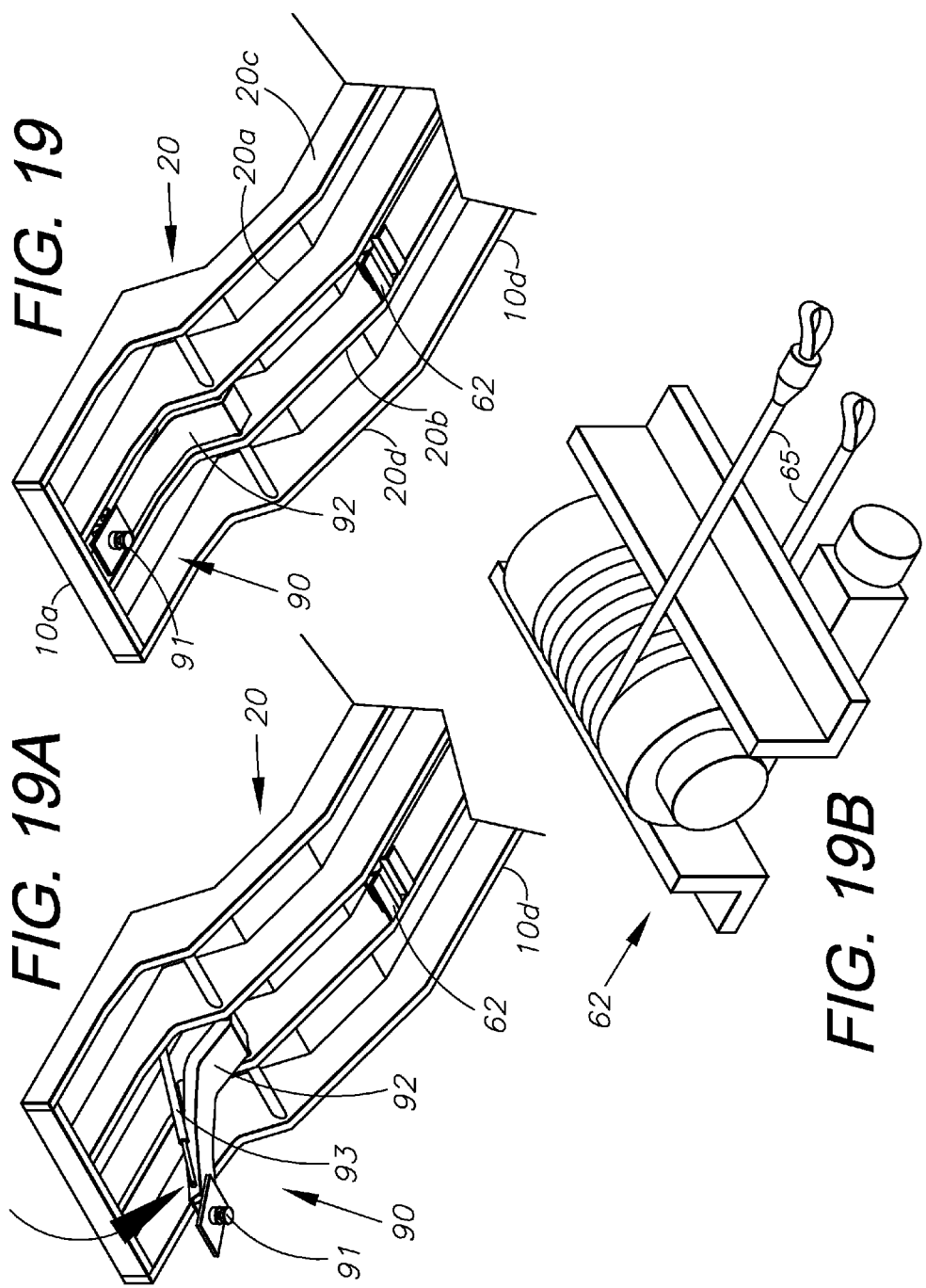

The vehicle transporter 10 includes a front end 10a, a back end 10b, a first side 10c and a second side 10d. A frame 20 includes first and second inboard, longitudinally-extending frame members 20a, 20b and first and second outboard, longitudinally-extending frame members 20c, 20d, the latter being located adjacent to the transporter sides 10c, 10d respectively (FIG. 19). The frame 20 is covered by a load deck 25 with a front portion 21 receiving the bus front wheels 13 and a rear portion 22 receiving the bus rear wheels 14 (FIG. 1). Load wells 23 are recessed into the load deck rear portion 22. The load wells 23 are upwardly open at the load deck 25. The vehicle rear wheels 14 are seated in the load wells 23 when the vehicle 11 is loaded on the transporter 10. The slightly-lowered front deck portion 21 and the load wells 23 position the vehicle 11 in a generally level, low-lying position for transport, thus minimizing the necessary overhead clearance for safe passage under overhead obstructions.

The undercarriage 60 includes front and rear axles 63 mounting wheels 61 and a bumper 64. An axle winch 62 slidably moves the undercarriage 60 between its forward, load position and its rearward, transport position via an undercarriage cable 65 connected to the undercarriage 60.

Figure 20:
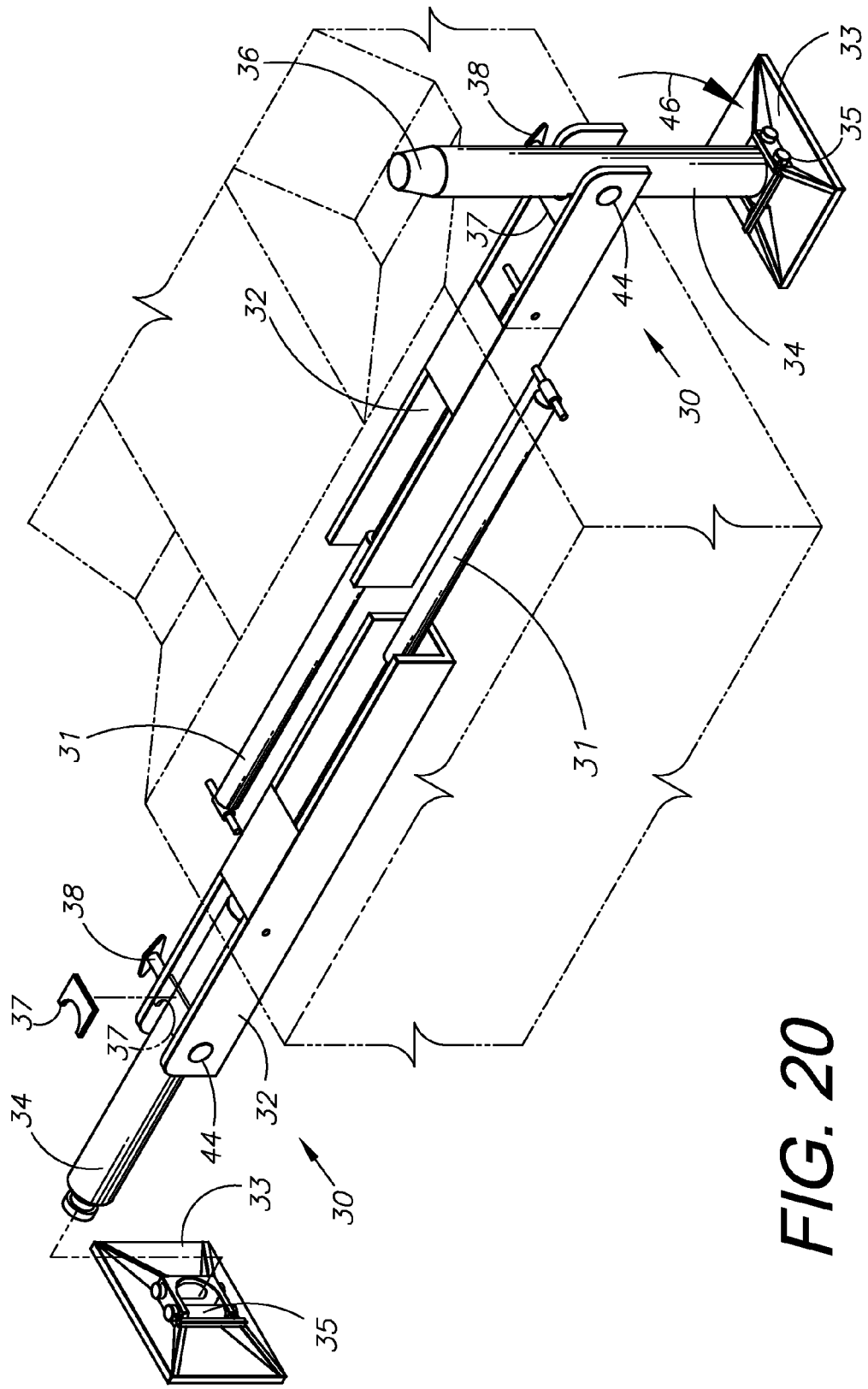
FIG. 20 is an enlarged, isometric view of the outrigger assemblies.
Figure 21:
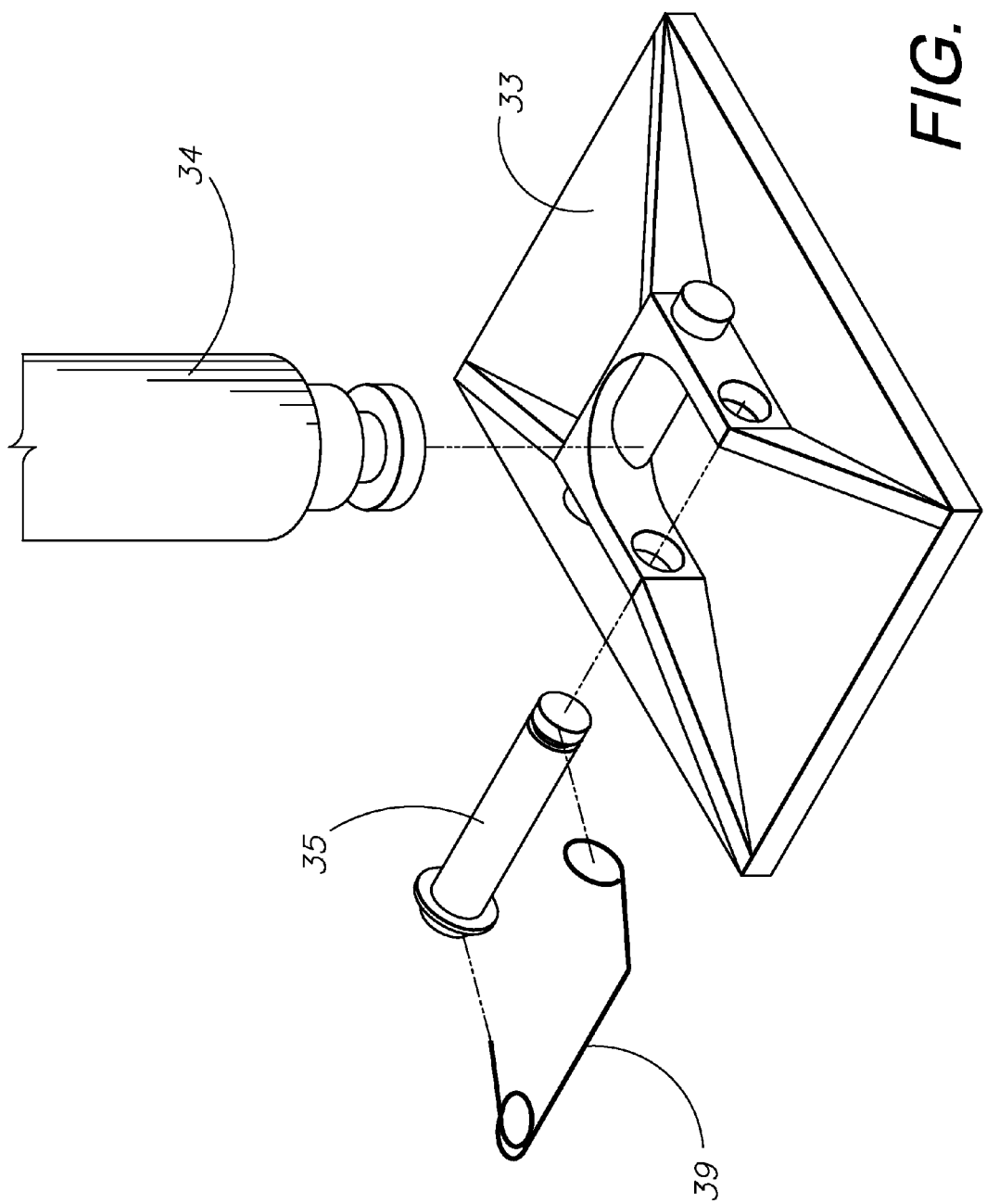
FIG. 21 is an exploded view showing an outrigger pad, a pad locking pin and a lift cylinder.
Figure 22:
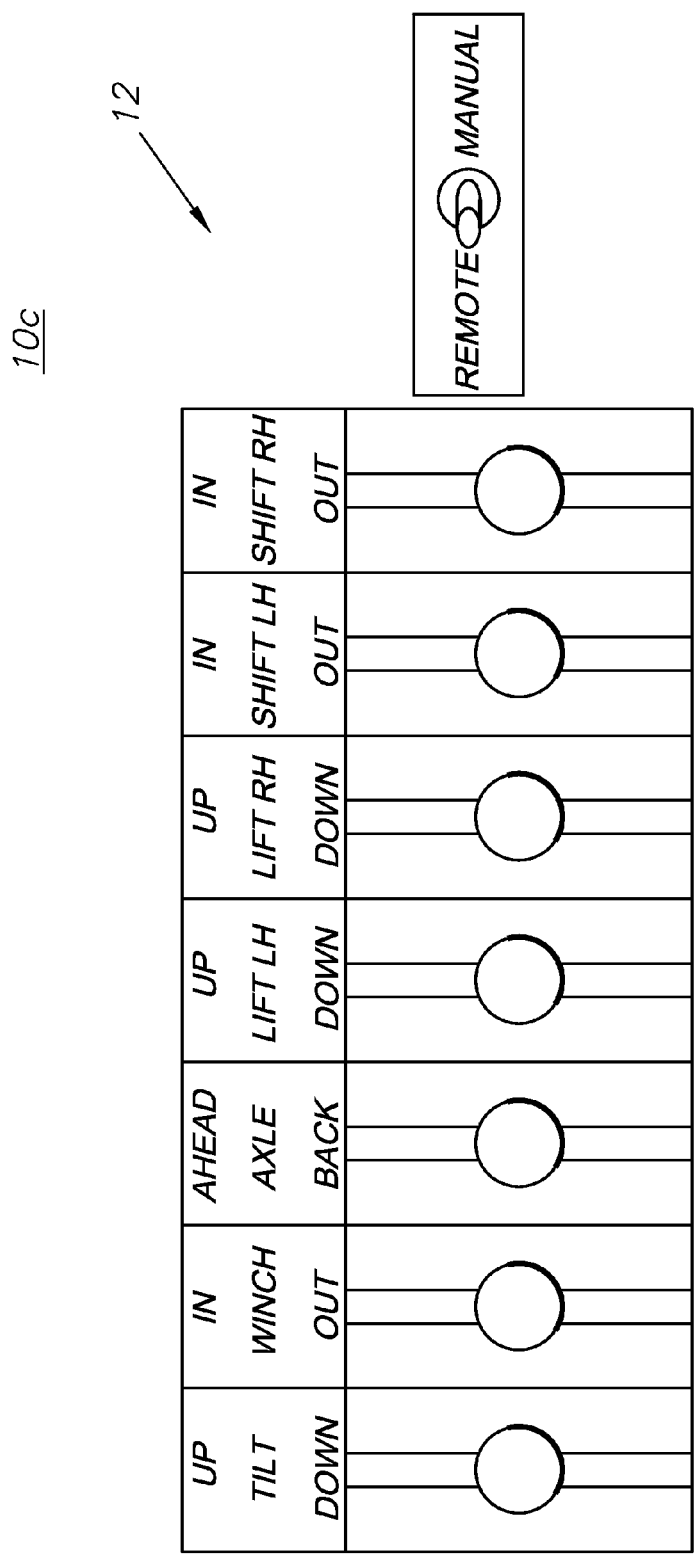
FIG. 22 shows a hydraulic control panel for the transporter hydraulic system.

A pair of outrigger assemblies 30 are mounted on the frame 20 under the rear deck portion 22. Referring to FIGS. 20 and 21, each outrigger assembly 30 includes a channel-shaped outrigger beam 32, which is extended and retracted relative to the frame 20 by a respective extension piston-and-cylinder unit 31. Each outrigger assembly 30 also includes a respective lift piston-and-cylinder unit 34 pivotally mounted on the distal end of the outrigger beam 32 and a base plate 33 adapted for selective mounting on a distal/lower end of the lift piston-and-cylinder unit 34 by a respective base plate locking pin 35 and a retainer 39. The outrigger assemblies 30 extend through the outboard side frame members 20c, 20d respectively.

Each lift piston-and-cylinder unit 34 is pivotally connected to the distal end of a respective outrigger beam 32 by a pivot pin 44, allowing the lift cylinder 34 to rotate from a horizontal position to a vertical position (rotation arrow 46, FIG. 20). The bottom surface of the outrigger beam 32 prevents the lift cylinder 34 from rotating past its vertical position. Each lift piston-and-cylinder unit 34 is secured in its vertical position by a removable locking plate 37 (FIG. 20), which is secured by a locking plate pin 38. Guide lights 36 can be attached to the upper ends of the lift units 34 in their vertical positions to assist with visually guiding the vehicle 11 onto the transporter 10. The lift piston-and-cylinder units 34 are adapted for raising the transporter 10 as shown in FIGS. 3 and 4 in order to elevate the undercarriage 60 above the pavement for shifting between fore and aft positions.

Referring to FIGS. 10-15, the subframe 40 includes a pair of adjustable support assemblies 70 each vertically movably mounted on a respective outboard frame member 20c, 20d at a respective transporter side 10c, 10d. Each support assembly 70 includes front and rear columns 71a, 71b extending upwardly from a respective web 72, which in turn extends upwardly from a respective base 73 adapted for selectively engaging and resting on a pavement surface 86. Each column 71a, 71b includes a pair of support brackets 84 on its inboard face. Front and back cross plates 80a, 80b extend between respective column pairs 71a, 71b and are connected to and supported by respective support brackets 84.

Hinges 82 are mounted on the cross plates 80a, 80b at their front and rear edges and adjacent to their opposite ends for a total of four hinges on each cross plate 80a, 80b, each of which pivotally mounts a respective panel 83. The panels extend forwardly and rearwardly from the cross plate front and rear edges respectively and are generally positioned in the load wells 23.

The subframe support assemblies 70 are movably mounted on the outboard frame members 20c, 20d by respective guide pins 41 and locking pins 42. Each guide pin 41 is slidably received in a respective vertically-extending guide pin slot 74 formed in a respective column 71a, 71b and a respective guide pin receiver 76 formed in a respective outboard frame member 20c, 20d. Each column 71a, 71b also includes a pair of vertically-extending lock pin slots 75 located fore and aft of the guide pin slot 74. Each outboard side frame member 20c, 20d includes multiple lock pin receivers 77 located in columns fore and aft of respective guide pin receivers 76.

The subframe 40 is movable between a raised, load position with the cross plates 80a, 80b and the panels 83 generally flush with the load deck 25, and a lowered, transport position with the end portions of the cross plates 80a, 80b and the panels 83 generally in the load wells 23. The panels 83 are folded upwardly and generally rest on the sloping faces of the frame members 20c, 20d in the load wells 23 when the subframe 40 is in its lowered, transport position (FIG. 1A) whereby the bus rear wheels 14 are captured in the load wells 23, thus securing the bus 11 against rolling fore-and-aft.

Figure 12:
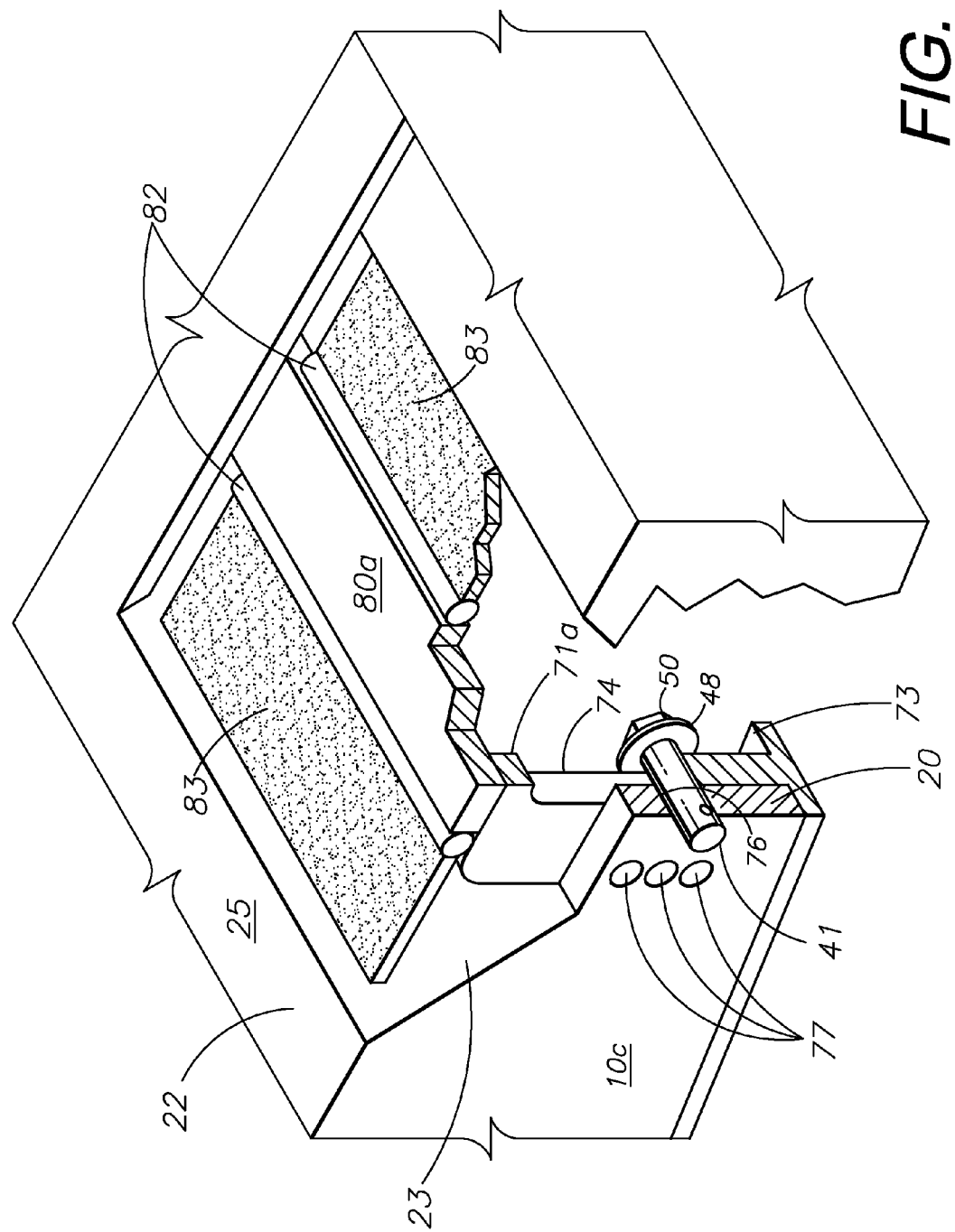
FIG. 12 is an enlarged, isometric view of a load well and a portion of the subframe, showing the connection between the subframe and the transporter main frame.
Figure 13:
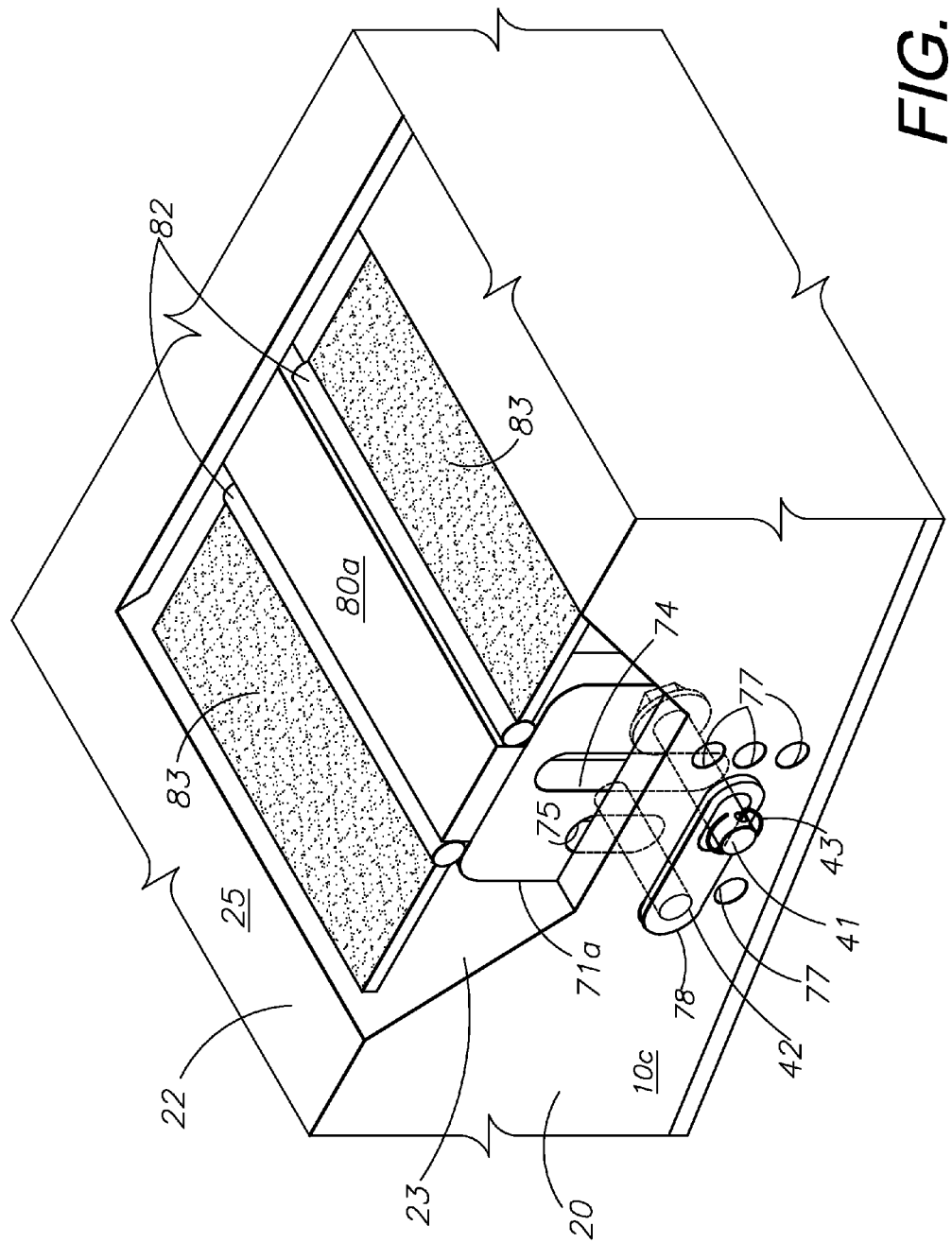
FIG. 13 is another enlarged, isometric view of the load well and a portion of the subframe, showing the subframe locked to the transporter frame by a subframe lock pin.
Figure 14:
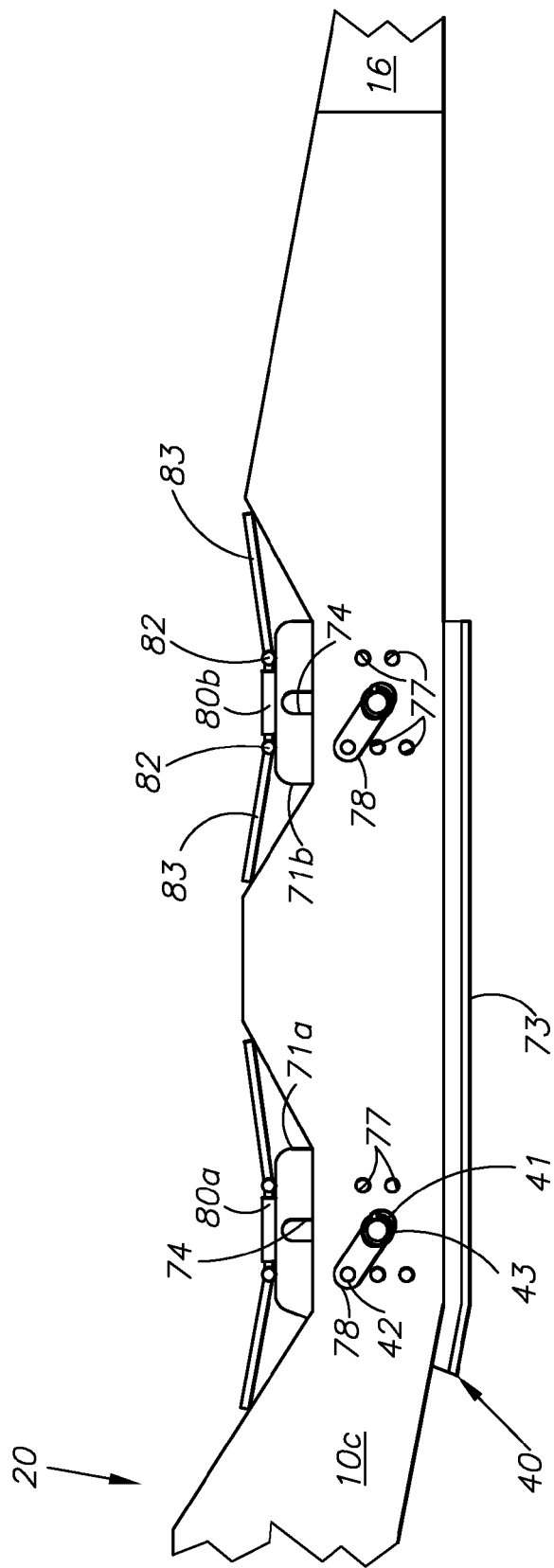
FIG. 14 is an enlarged side elevation showing subframe lock pins in position holding the subframe in a raised (relative to the transporter main frame) position.
Figure 15:
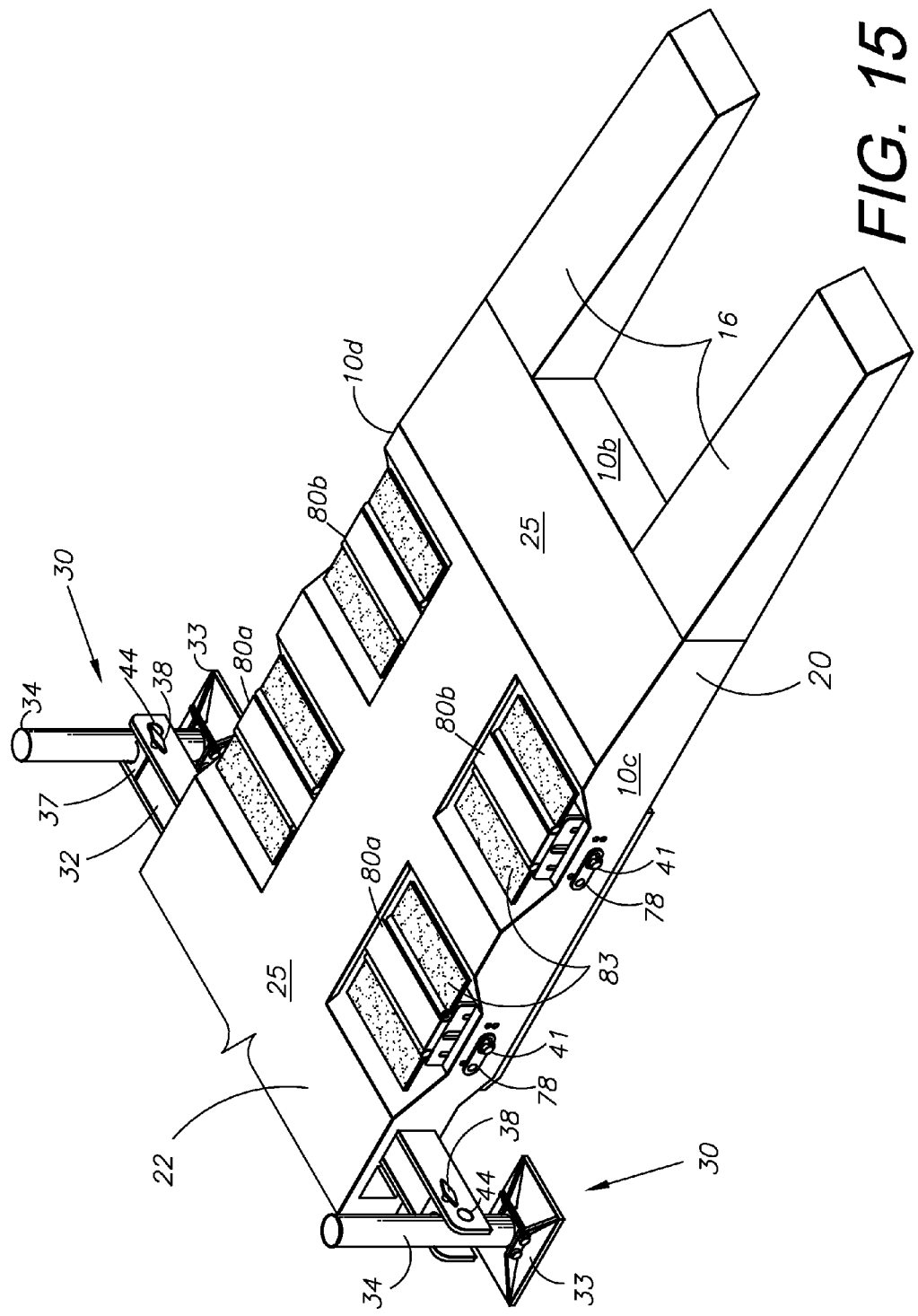
FIG. 15 is an enlarged, isometric view of the rear of the transporter with loading ramps engaging the support surface.

The column guide pin slots 74 align with respective frame member guide pin receivers 76 for receiving respective guide pins 41, which move vertically within the guide pin slots 74. Lock pins 42 extend through respective receivers 77 in the side frame members 20c, 20d and are attached to respective links 78, which receive the projecting distal ends of the guide pins 41 in elongated link receivers 79 providing a lost-motion linkage accommodating variable spacing between the guide and lock pins 41, 42. At their distal ends the guide pins 41 are captured within the elongated link receivers 79 by retainer clips 43, which are removable to accommodate repositioning the lock pins 42. The lock pins 42 are adapted for adjusting the depths of the load wells 23 by placement in respective lock pin receivers 77 located on either side of the guide pin 41. The adjustability of the wheel well 23 depths (by placing the lock pins 42 in receivers 77 corresponding to the desired depth of the wheel well 23) accommodates different ground clearances of various vehicles placed on the transporter 10. When the frame 20 is in its raised, transport position, the subframe 40 can be lowered to its suspended, transport position (FIG. 1A) by removing the retainer clips 43 and extracting the lock pins 42 along with the links 78. With the lock pins 42 removed, the subframe 40 is free to "float" relative to the main frame 20 as the main frame 20 is raised, lowered and tilted. The guide pins 41 are retained in place outboard by the retainer clips 43 and inboard by washers 48 engaging head portions 50 of the guide pins 41 whereby the guide pins 41 extend through respective frame outboard side members 20c, 20d and columns 71a, 71b (FIGS. 12 and 13). Alternatively, the guide pins 41 can be removed when the transporter 10 is in its transport configuration (FIG. 1A).

Figure 16:
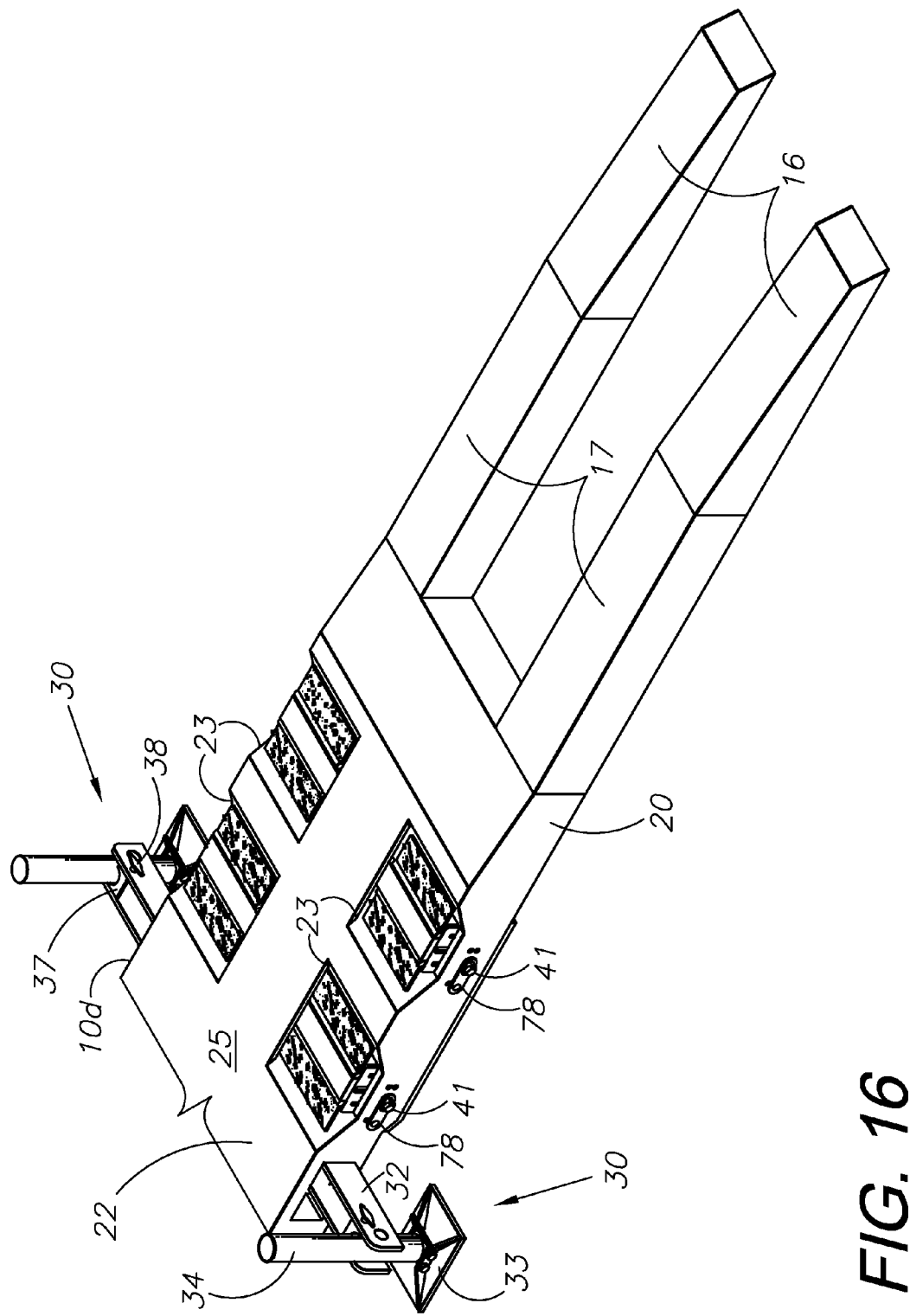
FIG. 16 is an enlarged, isometric view of the rear of the transporter with optional loading ramp extensions for further flattening the load angle.
Figure 17:
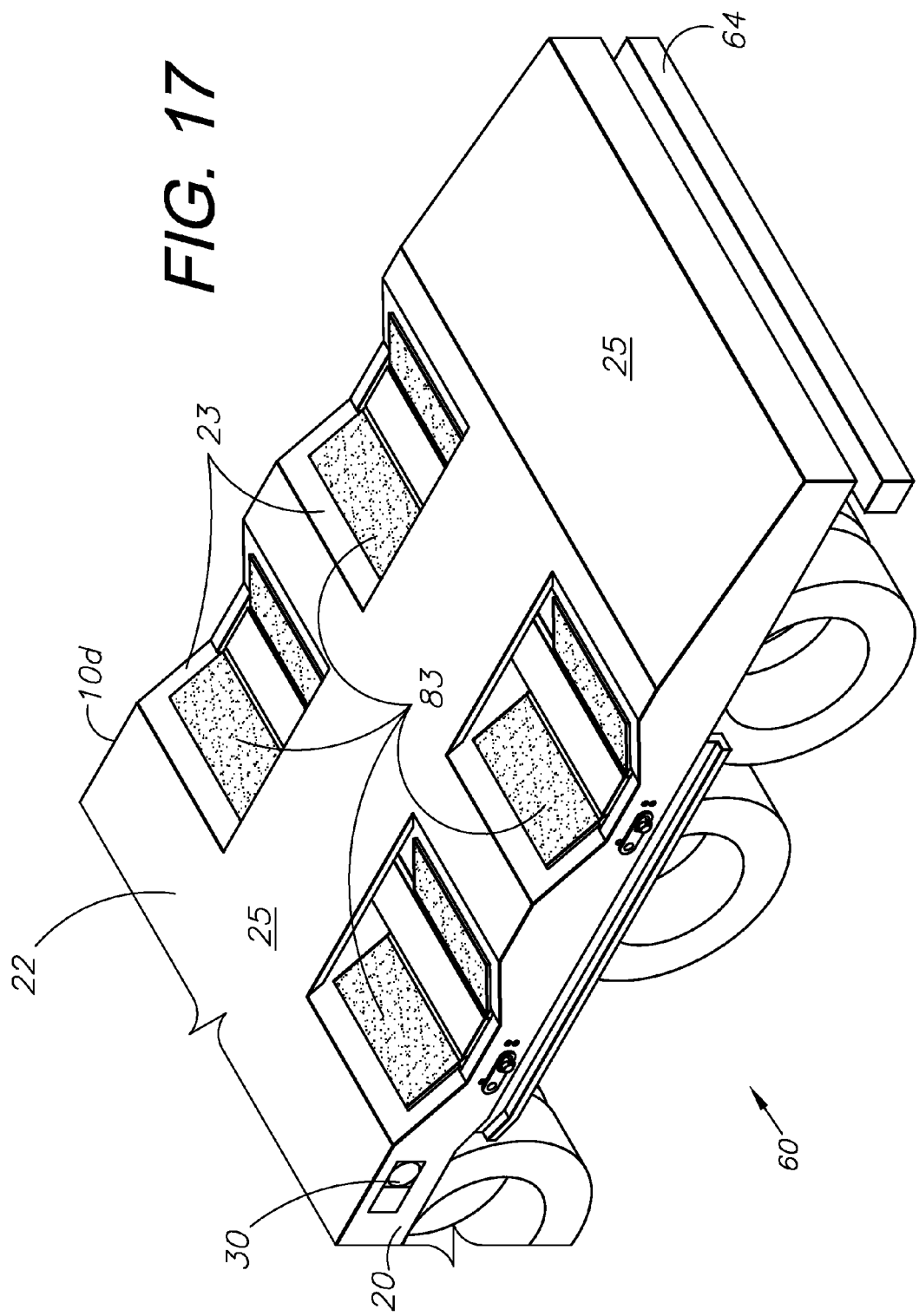
FIG. 17 is an enlarged, isometric view of the rear of the transporter with the undercarriage in its transport position and the subframe lowered (relative to the main transporter frame).

A loading winch 15 is mounted at the transporter front end 10a (FIGS. 6 and 18) and loads the vehicle 11, for example, when it cannot be driven onto the vehicle transporter 10. A cable 26 from the loading winch 15 passes through the load deck 25, extends rearwardly and emerges through the load deck front portion 21. During the loading process loading ramps 16 extend rearwardly from the trailer frame 20. The loading ramps 16 can be secured with chains 18 and tensioners 19 and transported in upright positions (FIG. 2). The loading ramps 16 are detachable from the vehicle transporter 10 and can be transported separately when transporting a vehicle 11. A set of loading ramp extensions 17 can be used as shown in FIG. 16. The use of the loading ramp extensions 17 can prevent a low-clearance vehicle from becoming high-centered on the raised rear deck portion 22. The loading ramp extensions 17 are placed between the back end 10b of the vehicle transporter 10 and the loading ramps 16.

Figure 18:
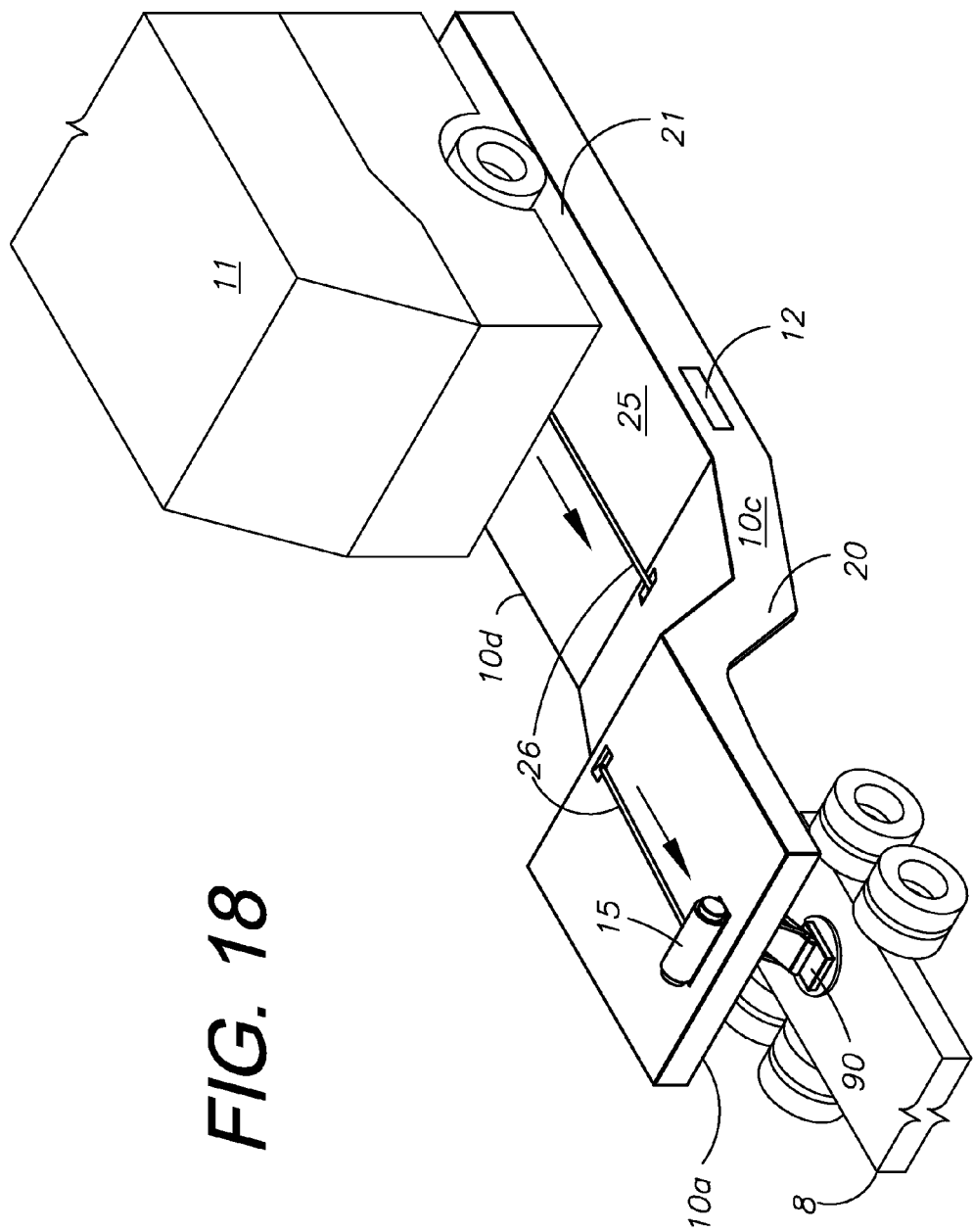
FIG. 18 is a fragmentary, isometric view of the front of the transporter showing the bus being pulled onto the deck by a loading winch.

Referring to FIGS. 18-19B, a front lifting connection assembly 90 is located on the underside of the front end 10a of the vehicle transporter 10. The connection assembly 90 includes a connection beam 92 that is pivotally attached at its proximate end to the frame 20. Attached to the distal end of the beam 92 is a king pin hitch 91. The king pin hitch 91 can connect to a king pin coupling on the tractor 8 as shown in FIGS. 1 and 18. In FIG. 19A, connection assembly piston-and-cylinder units 93 are shown connected at their proximate ends to the frame 20 and at their distal ends to the distal end of the connection beam 92. The connection assembly piston-and-cylinder units 93 are adapted for raising and lowering the front end 10a between its lowered, transport position and its raised load position. FIGS. 1 and 19 show the connection assembly cylinders 93 retracted and the transporter 10 lowered. FIGS. 2 and 19A show the connection assembly cylinder 93 extended and the transporter front 10a elevated.

III. Vehicle Transport Method

The method of loading the vehicle 11 onto the vehicle transporter 10 is shown in FIGS. 1-9. Referring to FIG. 2, after the transporter 10 is aligned with the vehicle 11, the connection assembly 90 hydraulically raises the front end 10a to its raised, load position. Referring to FIG. 3, after the front end 10a is raised, the outrigger assembly piston-and-cylinder units 34 raise the back end 10b. In addition, the loading ramps 16 are lowered into position and the guide lights 36 are attached to the upper ends of the lift piston-and-cylinder units 34. Referring to FIG. 4, the axle winch 62 moves the undercarriage/wheel assembly 60 forward to its load position.

Referring to FIG. 5, after the undercarriage/wheel assembly 60 has been moved forward, the outrigger assemblies 30 lower the back end 10b to its lowered, load position in proximity with the support surface (pavement) 66. Prior to the back end 10b reaching its load position, the subframe 40 engages the pavement surface 66 with the bases 73. The outrigger assemblies 30 continue to lower the back end 10b until it is in its load position. Meanwhile, as the outrigger assemblies 30 lower the back end 10b, the subframe 40 raises in the load wells 23 relative to the frame 20 and the panels 83 begin to unfold and align with the plates 80a, 80b until they are generally flush with the load deck 25, creating a surface over which the vehicle 11 can be loaded.

Referring to FIG. 6, after the outrigger assembly 30 has lowered the back end 10b, the vehicle 11 can be loaded onto the vehicle transporter 10. The vehicle 11 can either be manually driven or pulled by the loading winch 15 and cable 26 onto the vehicle transporter load deck 25. The vehicle 11 is loaded in a position where the front wheels 13 are located on the lowered front deck portion 21 and the rear wheels 14 are supported by the subframe plates 80a, 80b over the load wells 23.

Referring to FIG. 7, after the bus 11 is loaded, the outrigger assemblies 30 raise the back end 10b. Also, as the back end 10b raises, the panels 83 fold up and the plates 80a, 80b lower into the load wells 23 until the panels 83 are generally aligned with the sloping surfaces of the load wells 23 and the plates 80a, 80b are generally bottomed out in the load wells 23. Meanwhile, the rear wheels 14 lower into the load wells 23 until they are seated.

Referring to FIG. 8, the undercarriage/wheel assembly 60 is then moved rearwardly to its transport position. Referring to FIG. 9, after the wheel assembly 60 has returned to its transport position, the outrigger assemblies 30 can lower the frame 20 until the undercarriage/wheel assembly 60 engages the support surface. Next, the outrigger assemblies 30 are retracted and stowed for transport and the loading ramps 16 are removed and stowed for transport. Finally, the front lifting connection assembly 90 lowers the front end 10a, resulting in the vehicle transporter 10 being ready for transport as shown by FIG. 1.

Unloading the vehicle 11 and returning the transporter 10 to its empty, transport position generally involves reversing the steps described above. The sequence of the procedure can be varied as appropriate for different loads within the scope of the present invention.

It is to be understood that while certain embodiments and/or aspects of the invention have been shown and described, the invention is not limited thereto and encompasses various other embodiments and aspects. The preferred and alternative embodiments outlined herein are examples of two ways to

Having thus described the invention, what is claimed as new and desired to be secured by Letters Patent is:

1. A transporter for a vehicle including front and rear wheel pairs, which transporter comprises:

front and back ends;

opposite first and second sides;

a main frame including first and second outboard frame members adjacent said first and second sides respectively;

an undercarriage mounted on said main frame and including first and second wheels located adjacent to said first and second sides respectively;

a load deck including a front portion adjacent said front end and a rear portion adjacent said back and;

first and second wheel wells formed in said main frame adjacent to said first and second sides respectively and open upwardly at said load deck;

a subframe including first and second longitudinally-extending support assemblies and a cross plate extending transversely between said support assemblies and located generally in said load wells;

said support assemblies having lowered positions depending downwardly from said frame members with said cross plate below the level of said load deck and raised positions with said cross plate generally flush with said load deck;

each said main frame member and said support assembly having a respective guide pin receiver;

the main frame member guide pin receivers or the support assembly guide pin receivers comprising vertically-extending guide slots;

a pair of guide pins each positioned in a respective guide pin receiver and a respective guide slot, each said guide pin extending through a respective main frame member and a respective support assembly;

each said support assembly including a web, a base below the web and a column extending upwardly from the web;

said base being adapted for supporting said main frame on a pavement surface with said support assembly in its raised position relative to said main frame;

said cross plate being mounted on and supported by said columns;

said subframe including front and back pairs of panels each hingedly mounted on a respective front or back edge of said cross plate;

said panels having lowered positions generally in said wheel wells with said subframe in its lowered position and raised positions generally flush with said load deck and said cross plate with said subframe in its raised position;

a pair of outrigger assemblies each located adjacent to a respective outboard frame member;

each said outrigger assembly including an outrigger beam having a retracted position generally within said main frame and an extended position extending outwardly therefrom;

each said outrigger assembly including a lift piston-and-cylinder unit pivotally connected to a respective outrigger beam and rotatable between a horizontal position and a vertical position;

said lift piston-and-cylinder units being adapted for raising and lowering said transporter back end;

a hydraulic power source connected to and adapted for extending and retracting said lift piston-and-cylinder units;

each said outrigger assembly including a base plate removably mountable on a respective lift cylinder;

each said outrigger assembly including a base plate locking pin adapted for locking a respective base plate on a respective lift cylinder;

each said outrigger assembly including a retainer clip adapted for attaching to a respective base plate locking pin for retaining said locking pin on a respective base plate;

each said outrigger assembly including a lift cylinder locking plate with a locking position adapted for locking a lift cylinder in a generally vertical position on a respective outrigger beam;

each said outrigger assembly including a locking plate pin adapted for retaining a respective locking plate on a respective outrigger beam engaging a respective lift cylinder;

said undercarriage being longitudinally movable on said main frame between a rear, transport position and a forward, load/unload position;

said undercarriage in its forward position accommodating tilting said main frame;

an undercarriage winch mounted on said main frame and connected to said undercarriage;

said winch being adapted for moving said undercarriage between its forward and rear positions;

a connector hitch assembly mounted on said main frame at said front end and adapted for connection to a tow vehicle;

said hitch assembly being adapted for raising and lowering said transporter front end;

said connector hitch assembly including a beam with a proximate end pivotally mounted on said trailer main frame and a distal end mounting a king pin hitch;

a vehicle winch mounted on said main frame adjacent to said front end; and a cable received on said vehicle winch and adapted for loading a vehicle on said load deck.

* * * * *